United States Patent
Jeong et al.

(10) Patent No.: US 10,651,505 B2
(45) Date of Patent: May 12, 2020

(54) SECONDARY BATTERY AND METHOD OF MANUFACTURING SECONDARY BATTERY

(71) Applicant: SAMSUNG ELECTRONICS CO., LTD., Suwon-si, Gyeonggi-do (KR)

(72) Inventors: Huisu Jeong, Seongnam-si (KR); Kyounghwan Kim, Seoul (KR); Hwiyeol Park, Hwaseong-si (KR); Junhyeong Lee, Seoul (KR); Sungjin Lim, Suwon-si (KR); Jin S. Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 153 days.

(21) Appl. No.: 16/003,641

(22) Filed: Jun. 8, 2018

(65) Prior Publication Data

US 2019/0051942 A1 Feb. 14, 2019

(30) Foreign Application Priority Data

Aug. 8, 2017 (KR) .................. 10-2017-0100445

(51) Int. Cl.
*H01M 10/0583* (2010.01)
*H01M 10/0525* (2010.01)
(Continued)

(52) U.S. Cl.
CPC ....... *H01M 10/0583* (2013.01); *H01M 4/131* (2013.01); *H01M 4/485* (2013.01);
(Continued)

(58) Field of Classification Search
CPC ......... H01M 10/0583; H01M 10/0562; H01M 10/058; H01M 4/485; H01M 4/131;
(Continued)

(56) References Cited

U.S. PATENT DOCUMENTS 9,979,043 B2 5/2018 Yang et al.
2013/0149605 A1* 6/2013 Kakehata ............. H01M 4/045
429/211
(Continued)

FOREIGN PATENT DOCUMENTS

KR 101395846 B1 5/2014
KR 1020150142162 A 10/2015
(Continued)

OTHER PUBLICATIONS

Chaofeng Zhang et al., Additive-free synthesis of 3D porous V2O5 hierarchical microspheres with enhanced lithium storage properties, 2013, pp. 974-978, 6(3), Energy & Environmental Science.
Matthew J. Lacey et al., Electrodeposition of polymer electrolytes for 3D Li-ion microbatteries, 2012, 22 pages, University of Southampton School of Chemistry.

*Primary Examiner* — Stewart A Fraser
(74) *Attorney, Agent, or Firm* — Cantor Colburn LLP

(57) ABSTRACT

A secondary battery may include a plurality of cathode layers which have a porous structure including a plurality of pores, have a flat plate-shape, and are arranged to be spaced apart from each other in a direction. The secondary battery further includes an electrolyte layer including a first electrolyte film and a second electrolyte film, where the first electrolyte film surrounds external surfaces of the cathode layers, and the second electrolyte film is disposed in the pores of the cathode layers. The secondary battery further includes an anode layer surrounding the first electrolyte film.

20 Claims, 17 Drawing Sheets

(51) Int. Cl.
H01M 4/131 (2010.01)
H01M 4/485 (2010.01)
H01M 10/0562 (2010.01)
H01M 10/058 (2010.01)
H01M 4/02 (2006.01)

(52) U.S. Cl.
CPC ..... *H01M 10/058* (2013.01); *H01M 10/0525* (2013.01); *H01M 10/0562* (2013.01); *H01M 2004/028* (2013.01); *H01M 2300/0094* (2013.01)

(58) Field of Classification Search
CPC ..... H01M 10/0525; H01M 2300/0094; H01M 2004/028
See application file for complete search history.

(56) References Cited

U.S. PATENT DOCUMENTS

| | | | | |
|---|---|---|---|---|
| 2013/0260183 | A1* | 10/2013 | Ellis-Monaghan | H01M 2/22 429/7 |
| 2014/0335395 | A1* | 11/2014 | Ramasubramanian | H01M 4/70 429/142 |
| 2016/0204464 | A1* | 7/2016 | Cho | H01M 10/0459 |
| 2017/0084918 | A1 | 3/2017 | Yang et al. | |
| 2017/0104235 | A1 | 4/2017 | Cho et al. | |

FOREIGN PATENT DOCUMENTS

| | | |
|---|---|---|
| KR | 1020160086716 A | 7/2016 |
| KR | 1020170034606 A | 3/2017 |

\* cited by examiner

SECONDARY BATTERY AND METHOD OF MANUFACTURING SECONDARY BATTERY

CROSS-REFERENCE TO RELATED APPLICATION

This application claims priority to Korean Patent Application No. 10-2017-0100445, filed on Aug. 8, 2017, and all the benefits accruing therefrom under 35 U.S.C. § 119, the content of which in its entirety is herein incorporated by reference.

BACKGROUND

1. Field

The disclosure relates to a secondary battery and a method of manufacturing the secondary battery.

2. Description of the Related Art

A secondary battery, which is rechargeable and dischargeable, is widely used in various electronic devices, such as mobile phones, notebook computers, camcorders, etc. In particular, a lithium secondary battery has a higher voltage and higher energy density per unit weight than a nickel-cadmium battery or a nickel-hydrogen battery, and thus, the demand for lithium secondary batteries has gradually increased.

As the types of electronic device including a secondary battery have diversified and related markets have grown, the demand on a secondary battery with improved performance in various aspects, such as increase in energy density, improvement of rate capability, increase in stability and durability and ensuring flexibility, has increased. Energy density is related to an increase in capacity, and rate capability is related to charge velocity of a secondary battery.

SUMMARY

Embodiments of the invention relate to a secondary battery and a method of manufacturing the secondary battery.

According to an embodiment, a secondary battery includes: a plurality of cathode layers arranged spaced apart from each other in a direction, where each of the cathode layers has a porous structure including a plurality of pores and has a flat plate-shape; an electrolyte layer including a first electrolyte film surrounding external surfaces of the cathode layers, and a second electrolyte film disposed in the pores of the cathode layers; and an anode layer surrounding the first electrolyte film.

In an embodiment, a volume ratio of the pores to a total volume of the cathode layers may be in a range of about 12 vol % to about 30 vol %.

In an embodiment, an aspect ratio of a height direction to a thickness direction of each of the cathode may be in a range from about 3 to about 10.

In an embodiment, each of the cathode layers may have a thickness in a range of about 30 μm to about 50 μm.

In an embodiment, each of the cathode layers includes a first surface and a second surface facing each other, and a third surface and a fourth surface facing each other, where the third and fourth surfaces extend between the first and second surfaces, and have an area smaller than an area of the first and second surfaces, and the cathode layers are arranged in a way such that the first surface of a cathode layer of the cathode layers and the second surface of an adjacent cathode layer, which adjacent to the cathode layer among the cathode layers, face each other.

In an embodiment, the first electrolyte film and the anode layer may be disposed on the first surface and the second surface of each of the cathode layers.

In an embodiment, the secondary battery may further include a cathode current collecting layer facing and contacting an end portion of each of the cathode layers, and an anode current collecting layer contacting a portion of the anode layer and facing the cathode current collecting layer.

In an embodiment, the cathode layers, the electrolyte layer, the anode layer, the cathode current collecting layer and the anode current collecting layer may collectively define a battery cell, and the secondary battery may have a stacking structure in which battery cells are stacked one on another.

In an embodiment, each of the cathode layers may be a sintered body including a cathode active material.

In an embodiment, the cathode active material may be a lithium transition metal oxide.

In an embodiment, a portion of the first electrolyte film may extend from the cathode layer to the adjacent cathode layer in the direction.

In an embodiment, a portion of the anode layer may extend from the cathode layer to the adjacent cathode layer in the direction.

In an embodiment, a gap between two adjacent cathode layers may be greater than 50% of a thickness of each of the cathode layers.

In an embodiment, the secondary battery may be a lithium secondary battery.

According to another embodiment, a method of manufacturing a secondary battery includes: arranging a plurality of cathode layers to be spaced apart from each other in a direction on a cathode current collecting layer, where each of the cathode layers has a porous structure including a plurality of pores and has a flat plate-shape; and coating an electrolyte layer on the cathode layers.

In an embodiment, a volume ratio of the pores to a total volume of the cathode layers may be in a range from about 12 vol % to about 30 vol %.

In an embodiment, each of the cathode layers may have a thickness in a range from about 30 μm to about 50 μm.

In an embodiment, the electrolyte layer may include a first electrolyte film and a second electrolyte film, where the first electrolyte film surrounds external surfaces of the cathode layers, and the second electrolyte film is arranged in the pores.

In an embodiment, the coating the electrolyte layer on the cathode layers may include using a spin coating method or a dip coating method.

In an embodiment, each of the cathode layers may be a sintered body including a cathode active material.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1A:
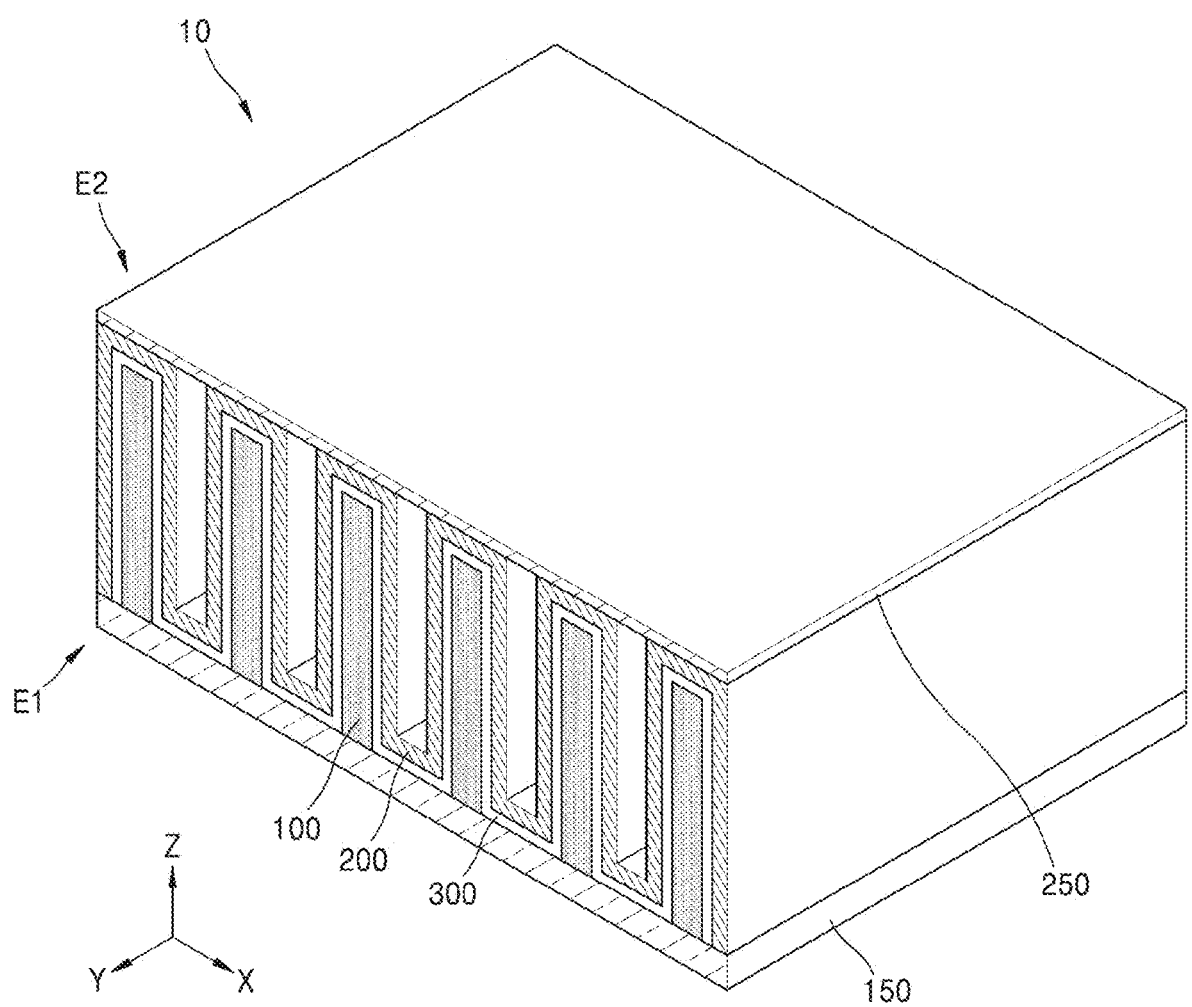
FIG. 1A is a perspective view of a secondary battery according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Embodiments of three-dimensional ("3D") electrode structures, secondary batteries including the 3D electrode structures, and methods of manufacturing the secondary batteries will now be described in detail with reference to the accompanying drawings.

Figure 1B:
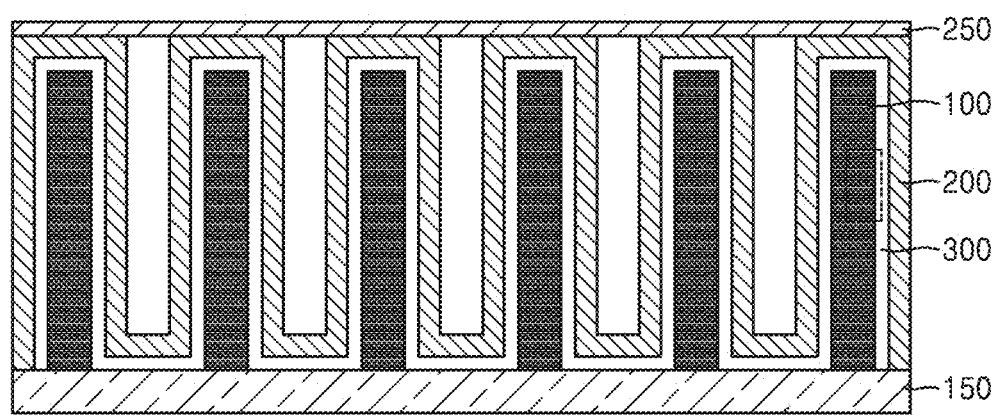
FIG. 1B is a cross-sectional view of a secondary battery according to an embodiment of the invention.
Figure 1B:
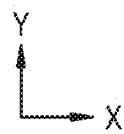
Figure 1C:
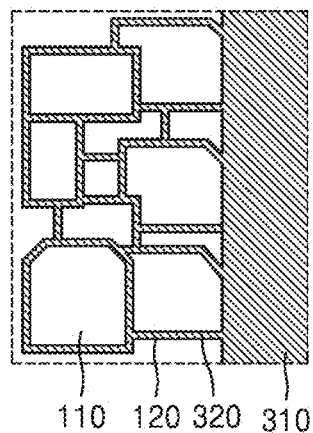
FIG. 1C is an enlarged view of the encircled portion in FIG. 1B.
Figure 2A:
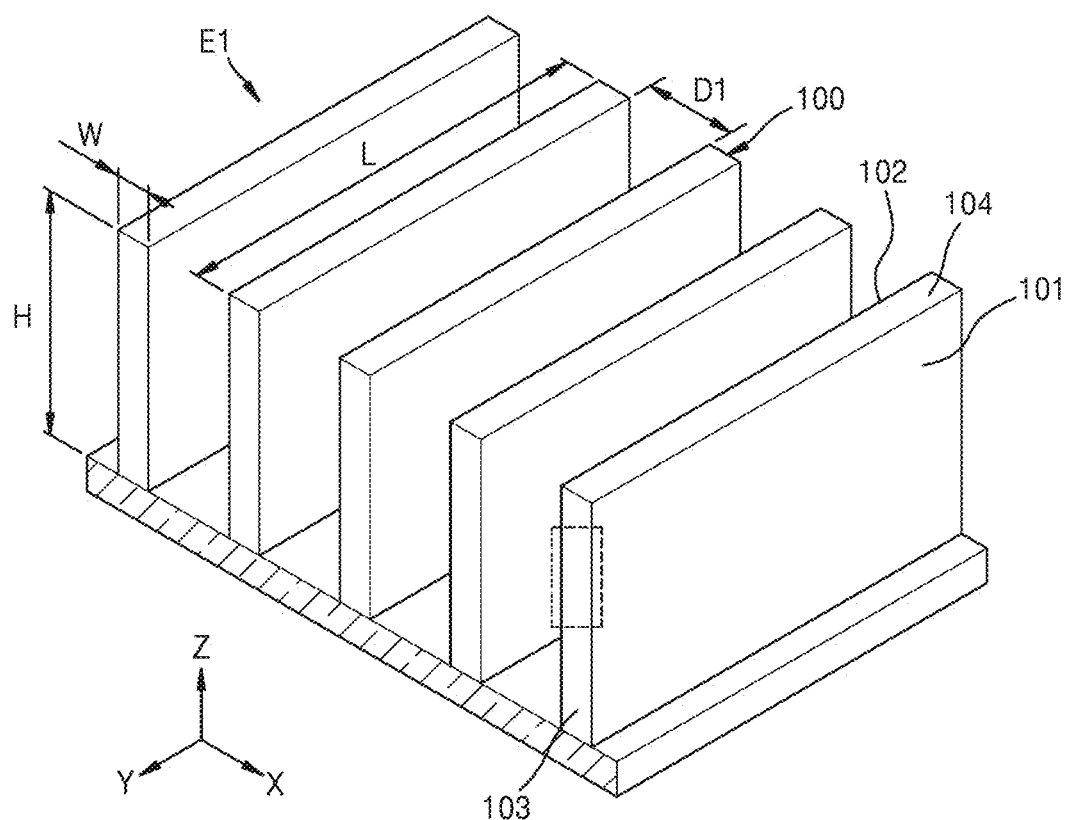
FIG. 2A is a perspective view of a first electrode structure according to an embodiment of the invention.
Figure 2B:
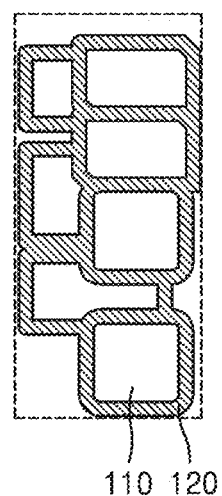
FIG. 2B is an enlarged plan view of the encircled portion of FIG. 2A.

FIG. 1A is a perspective view of a secondary battery 10 according to an embodiment. FIG. 1B is a cross-sectional view of the secondary battery 10 according to an embodiment. FIG. 1C is an enlarged view of the encircled portion in FIG. 1B. FIG. 2A is a perspective view of a first electrode structure E1 according to an embodiment. FIG. 2B is an enlarged plan view of the encircled portion of FIG. 2A.

Referring to FIGS. 1A to 1C, an embodiment of the secondary battery 10 may include a first electrode structure E1 including a plurality of cathode layers 100 having a flat plate-shape, a second electrode structure E2 including an anode layer 200, and an electrolyte layer 300 between the first electrode structure E1 and the second electrode structure E2. In an embodiment, as shown in FIG. 1A, a structure of the secondary battery 10 may include a single battery cell (or a unit cell). Alternatively, the secondary battery 10 may have a stacking structure in which a plurality of single battery cells is stacked. The secondary battery having a stacking structure will be described later in detail with reference to FIG. 6.

In an embodiment, the first electrode structure E1 may include a first current collecting layer 150 and the anode layers 200 electrically connected to the first current collecting layer 150. In one embodiment, for example, the cathode layers 100 may have a flat plate-shape and a porous structure including a plurality of pores 120. In such an embodiment, as shown in FIG. 2B, the cathode layers 100 may include a cathode active material 110. In one embodiment, for example, the cathode active material 110 may include a Li-containing oxide. The Li-containing oxide may be an oxide including Li and a transition metal. The Li-containing oxide may be, for example, $LiMO_2$ (M=metal), where M may be one of Co, Ni, Mn, and a combination thereof. In one embodiment, for example, the $LiMO_2$ may be $LiCoO_2$. The cathode active material 110 may include a ceramic of a cathode composition, and may be a polycrystalline or a single crystal. However, the materials of the cathode active material 110 described above are merely exemplary, and thus, other cathode active materials may be used as the cathode active material 110.

In an embodiment, where the cathode layers 100 include the cathode active material 110, the cathode active material 110 included in the cathode layers 100 may be distributed with pores 120 therebetween. In such an embodiment, a volume ratio of the pores 120 to a total volume of the cathode layers 100 may be greater than 12 vol % and less than 30 vol %, and a volume ratio of the cathode active material 110 to a total volume of the cathode layers 100 may be greater than 77 vol % and less than 80 vol %. A ratio between the cathode active material 110 and the pores 120 in the cathode layers 100 may be determined according to a sintering temperature and a sintering time in a process of sintering the cathode active material 110. The ratio between the cathode active material 110 and the pores 120 in the cathode layers 100 will be described later in greater detail with reference to FIG. 3A through FIG. 4C.

In an embodiment, the first current collecting layer 150 may be a cathode current collector. In an embodiment, the first current collecting layer 150 may have a plate-shape, and may be referred to as a current collecting plate. The first current collecting layer 150 may include, for example, at least one conductive material selected from Cu, Au, Pt, Ag, Zn, Al, Mg, Ti, Fe, Co, Ni, Ge, In, and Pd. In an embodiment, the first current collecting layer 150 may be a metal layer, but not being limited thereto. Alternatively, the first current collecting layer 150 may be a layer including other conductive materials which are not metals.

The cathode layers 100 described above may be arranged to protrude from the first current collecting layer 150, and thus, may be electrically connected to the first current collecting layer 150. In an embodiment, as shown in FIG. 2A, the cathode layers 100 may be arranged perpendicular to a surface of the first current collecting layer 150 having a plate-shape. In such an embodiment, the cathode layers 100 may have a width (thickness) W and a length L greater than the width W. In one embodiment, for example, each of the cathode layers 100 may have a thickness W in an X-axis direction, and a length L in a Y-axis direction perpendicular to the X-axis direction. Each of the cathode layers 100 may have a height H in a direction perpendicular to the thickness direction (i.e., X-axis direction) and the length direction (i.e., Y-axis direction), that is, in a direction perpendicular to the first current collecting layer 150. In other words, a length in a Z-axis direction of the cathode layers 100 may be the height of the cathode layers 100. The height H may be greater than the thickness W and smaller than the length L. Here, a ratio of the height H to the thickness W may be referred to as a height direction aspect ratio ("AR"), and a ratio of the length L to the thickness W may be referred to as a length direction AR.

In an embodiment, each of the cathode layers 100 may have, for example, two side surfaces having a relatively wide area, that is, first and second side surfaces 101 and 102 facing each other, and may have third and fourth side surfaces 103 and 104 facing each other, extending between the first and second side surfaces 101 and 102, and having a relatively smaller area than that of the first and second side surfaces 101 and 102. In such an embodiment, two of the cathode layers 100 adjacent to each other may be arranged in a way such that the first side surface 101 and the second side surface 102 face each other.

In an embodiment, the cathode layers 100 may be arranged spaced apart from each other by a first distance D1 in the thickness direction (the X-axis direction). In such an embodiment, spaces may be defined between the cathode layers 100 in the thickness direction (the X-axis direction). In one embodiment, for example, each of the cathode layers 100 may have a thickness W in a range of about 30 micrometers (μm) to about 50 μm. The height H may be greater than the thickness W. A ratio of the thickness W to the height H, that is, an AR in the height direction may be in a range from about 3 to about 10. The length L may be greater than the height H. In an embodiment, the height L of each of the cathode layers 100 may be in a range from about 70 μm to about 1200 μm. In one embodiment, for example, the height H of each of the cathode layers 100 may be in a range of about 90 μm to about 500 μm. However, the above ranges of the thickness W, the height H, and the length L are merely exemplary, and thus, may vary. In one alternative embodiment, for example, the thickness W may be greater than 50 μm, the height H may be greater than 500 μm, and the length L may be greater than 1200 μm. The first distance D1 in the thickness direction of the cathode layers 100 may greater than about 50% of the thickness W of the cathode layers 100. In one embodiment, for example, the first distance D1 may be in a range of about 15 μm to about 50 μm, or about 30 μm to about 50 μm. However, the above ranges of the first distance D1 are merely exemplary, and thus, may vary. In one alternative embodiment, for example, the first distance D1 may be greater than 50 μm.

In an embodiment, as described above, since the cathode layers 100 are arranged spaced apart from each other in the thickness direction and spaces are defined between the cathode layers 100, the electrolyte layer 300, which will be described below, may be provided on the cathode layers 100 in various ways.

Referring to FIGS. 1A to 1C, the electrolyte layer 300 may be arranged on the cathode layers 100 and the first current collecting layer 150. In an embodiment, the electrolyte layer 300 may include a first electrolyte film 310 and a second electrolyte film 320. The first electrolyte film 310 may be arranged on the cathode layers 100 and the first current collecting layer 150, and the second electrolyte film 320 may be arranged in the pores 120 in the cathode layers 100.

The first electrolyte film 310 may have a winding form corresponding to the shape of the cathode layers 100. In one embodiment, for example, the first electrolyte film 310 may be arranged on at least on each of the first side surface 101 and the second side surface 102 of the cathode layers 100, and may have a structure extending between the cathode layers 100 along the thickness direction of the cathode layers 100. However, embodiments are not limited thereto. Alternatively, the first electrolyte film 310 may be further arranged on the third and fourth side surfaces 103 and 104.

The second electrolyte film 320 may be disposed in the pores 120 in the cathode layers 100. The second electrolyte film 320 may be formed by a same process and of a same material as the first electrolyte film 310. Accordingly, the second electrolyte film 320 may increase ion conductivity in the cathode layers 100. The ion conductivity in the cathode layers 100 will be described later in detail with reference to FIGS. 3A through 5.

In an embodiment, the electrolyte layer 300 may include a solid electrolyte. In one embodiment, for example, the electrolyte layer 300 may include a solid electrolyte, such as $Li_3PO_4$, $Li_3PO_{4-x}N_x$, $LiBO_{2-x}N_x$, $Li_3PO_4N_x$, $LiBO_2N_x$, $Li_4SiO_4$—$Li_3PO_4$, $Li_4SiO_4$—$Li_3VO_4$, or $Li_7La_3Zr_2O_{12}$ ("LLZO"). In an embodiment, the electrolyte layer 300 may include a polymer electrolyte. However materials and types of the electrolyte layer 300 are not limited those described above, and materials and types of the electrolyte layer 300 may be changed in various ways.

The second electrode structure E2 may include the anode layer 200 and a second current collecting layer 250 electrically connected to the anode layer 200. The anode layer 200 may include an anode active material, and the second current collecting layer 250 may be an anode current collecting layer. In an embodiment, the anode active material included in the anode layer 200 may include, for example, a Li metal, a carbon group material, a silicon group material, or an oxide. In an embodiment, the anode current collecting layer may include, for example, at least one conductive material selected from Cu, Au, Pt, Ag, Zn, Al, Mg, Ti, Fe, Co, Ni, Ge, In and Pd. However, the anode active material and the materials of the anode current collecting layer are not limited thereto.

In an embodiment, the second current collecting layer 250 may face the first current collecting layer 150. The anode layer 200 may have a winding form corresponding to the shape of the cathode layers 100 while electrically contacting the second current collecting layer 250. In one embodiment, for example, the anode layer 200 may be arranged on at least each of the first side surface 101 and the second side surface 102 of the cathode layers 100, and may have a structure extending between the cathode layers 100 along the thickness direction of the cathode layers 100. In such an embodiment, portions of the anode layer 200 extending between the cathode layers 100 may have a flat plate-shape. Accordingly, the portions of the anode layer 200 extending between the cathode layers 100 may be referred to as "a plurality of anode layer plates". In an embodiment, the cathode layers 100 and the anode layer plates may be alternately arranged with each other. In such an embodiment, the first electrolyte film 310 may be arranged between the cathode layers 100 and the anode layer plates. The second electrolyte film 320 may be arranged between the cathode layers 100.

In an embodiment of the secondary battery 10 including the first electrode structure E1 and the second electrode structure E2, as described above, the first electrode structure E1 is a three-dimensional ("3D") structure in which the cathode layers 100 are perpendicular (or substantially perpendicular) to the first current collecting layer 150, and the second electrode structure E2 includes the anode layer 200 and the second current collecting layer 250, such that a capacity and energy density of the secondary battery 10 may be substantially increased compared to a secondary battery including a two-dimensional ("2D") electrode structure (e.g., a planar-type structure). Since the 3D electrode structure may ensure a high active material volume ratio and a wide reaction area when compared to a planar-type electrode structure, the secondary battery 10 may have increased energy density and increased rate capability.

However, when the cathode active material 110 included in the cathode layers 100 is sintered to a high density to increase the capacity of the secondary battery 10, ion conductivity of the cathode layers 100 may be reduced, and thus, the energy density and the rate capability of the secondary battery 10 may be reduced. Hereinafter, an embodiment of the secondary battery 10 in which ion conductivity in the cathode layers 100 is increased by arranging the second electrolyte film 320 in the cathode layers 100 will now be described in detail.

Figure 3A:
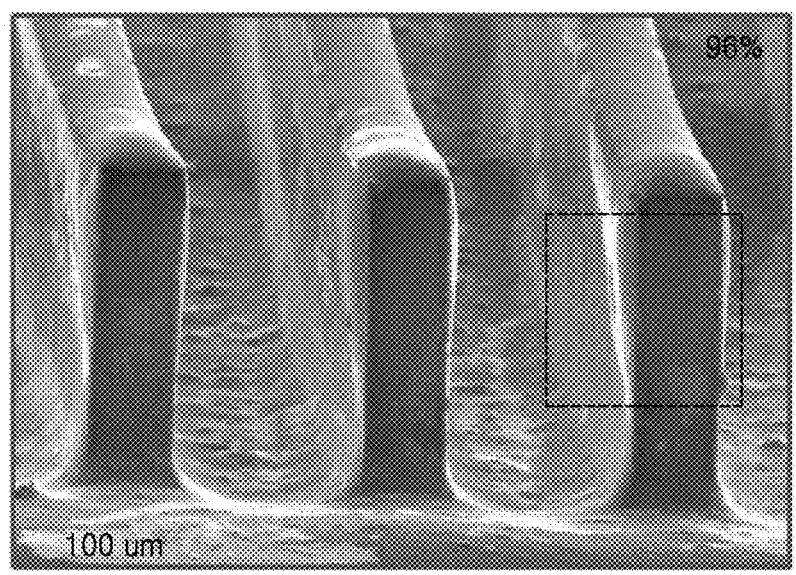
FIG. 3A is a scanning electron microscope ("SEM") image of a first electrode structure including an electrolyte layer, according to a comparative example.
Figure 3B:
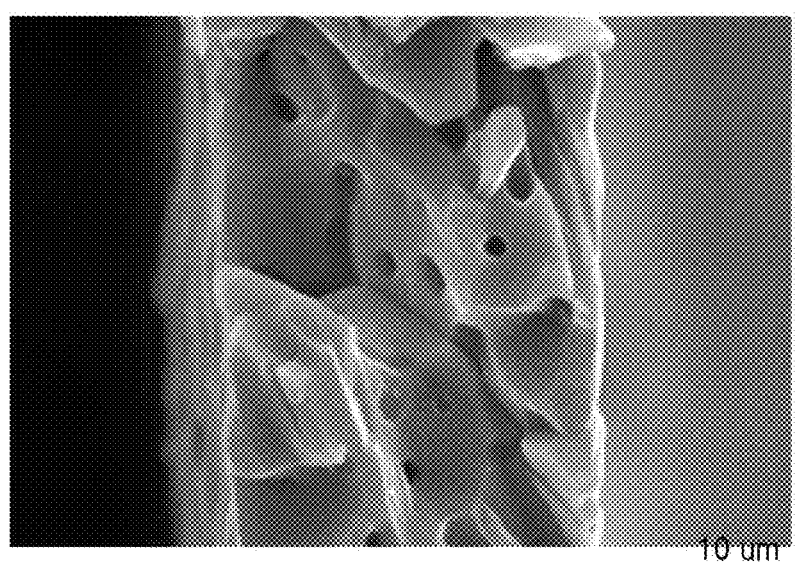
FIG. 3B is a magnified view of the SEM image of FIG. 3A.
Figure 3C:
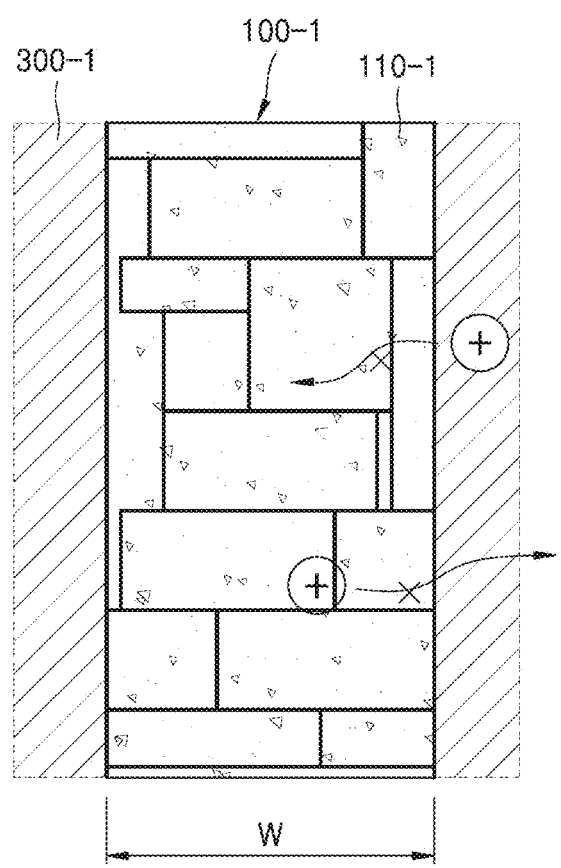
FIG. 3C is a schematic diagram of a cathode layer including an electrolyte layer, according to a comparative example.
Figure 3D:
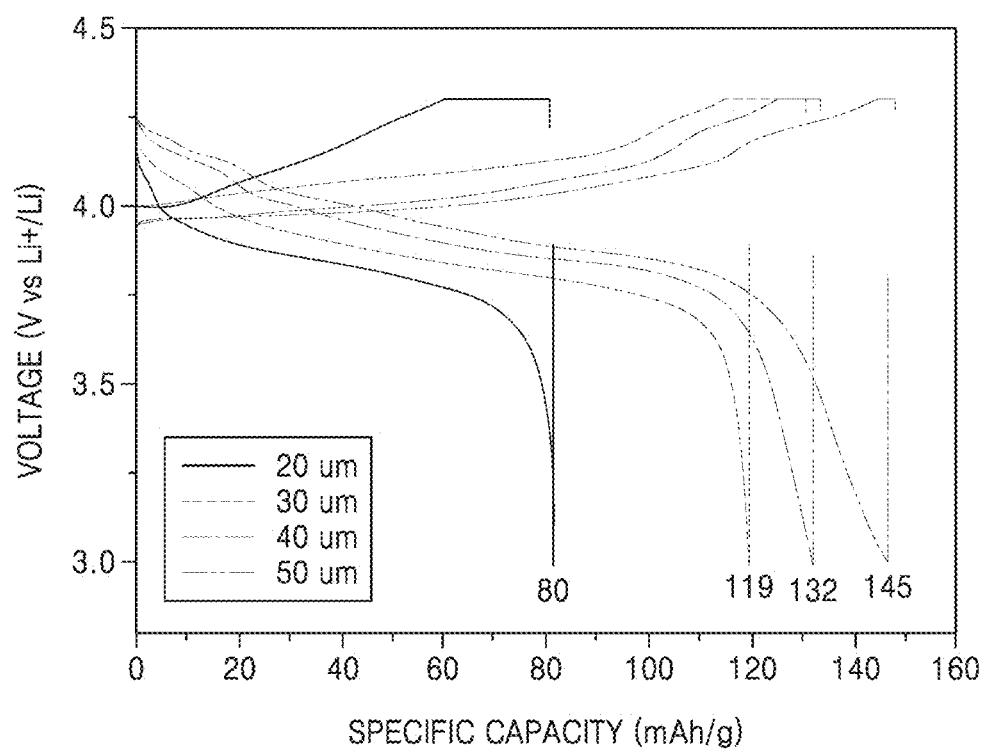
FIG. 3D is a graph showing variations of a voltage and a specific capacity of a secondary battery according to a comparative example.
Figure 4A:
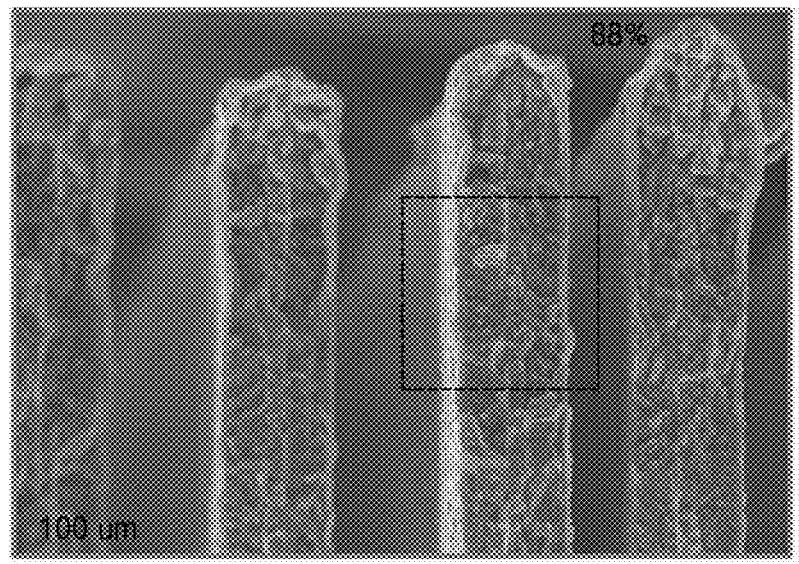
FIG. 4A is an SEM image of a first electrode structure including an electrolyte layer, according to an embodiment of the invention.
Figure 4B:
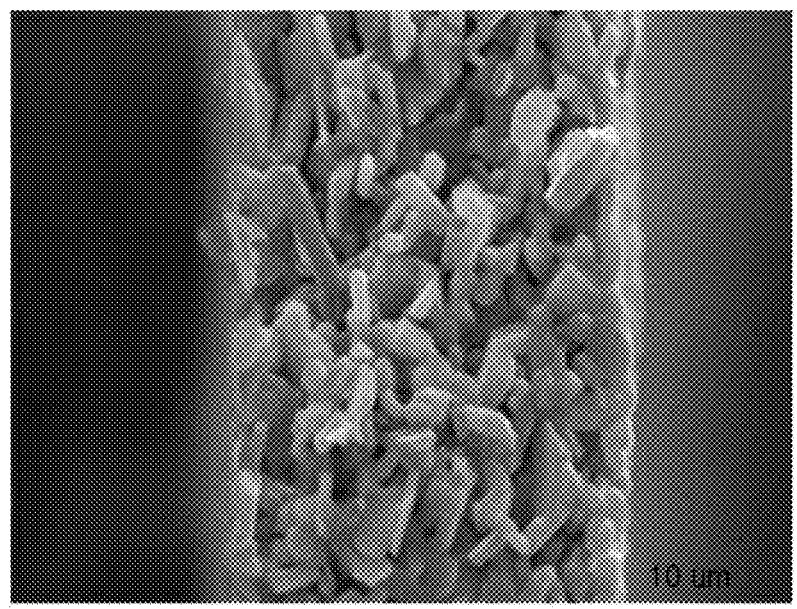
FIG. 4B is a magnified view of the SEM image of FIG. 4A.
Figure 4C:
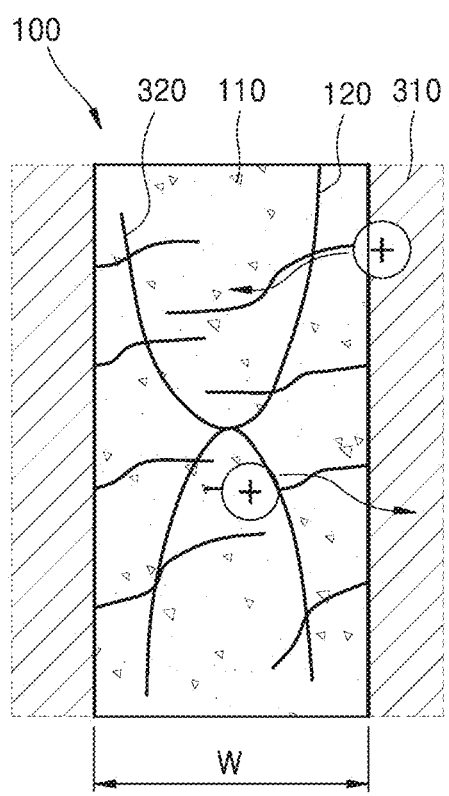
FIG. 4C is a schematic diagram of a cathode layer including an electrolyte layer, according to an embodiment of the invention.
Figure 4D:
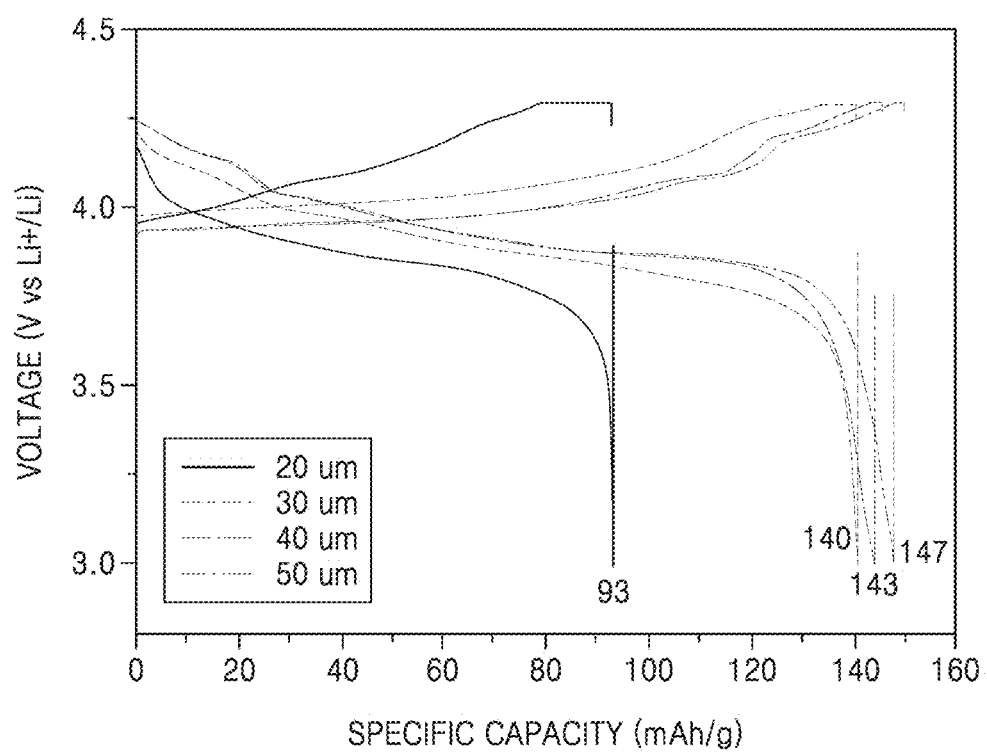
FIG. 4D is a graph showing variations of a voltage and a specific capacity of a secondary battery according to an embodiment of the invention.
Figure 5:
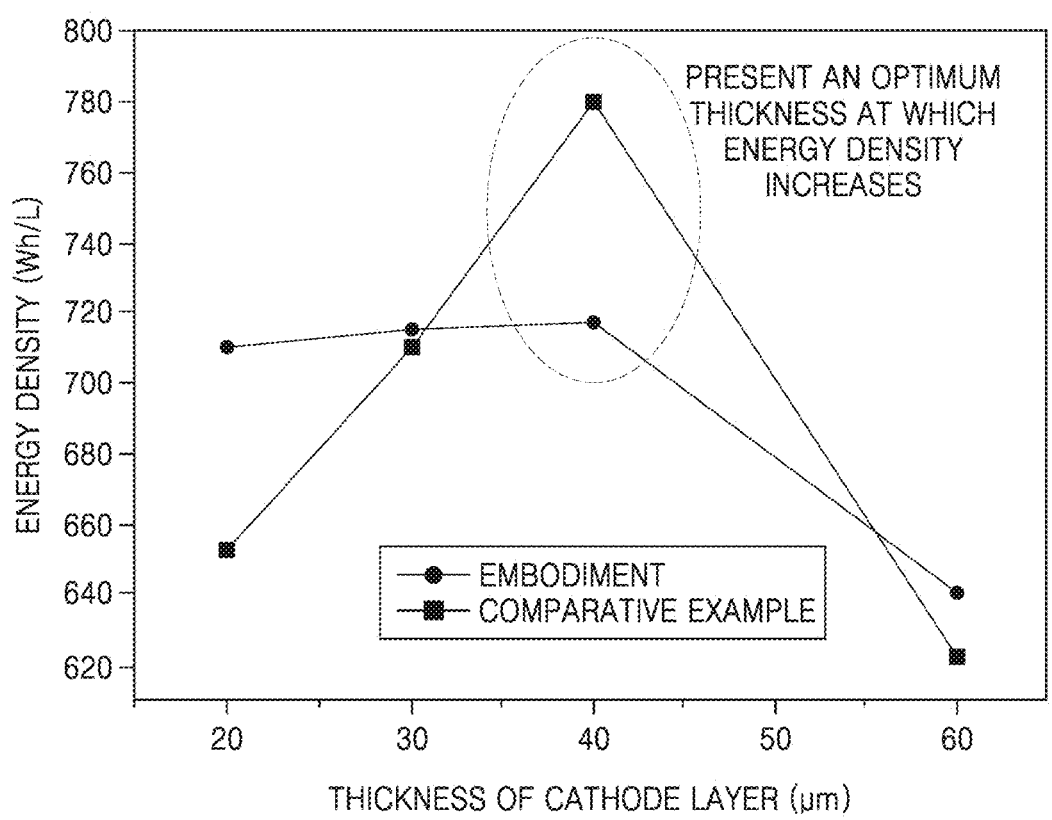
FIG. 5 is a graph showing variations of energy density according to changes in thickness of a cathode layer according to an embodiment of the invention.

FIG. 3A is a scanning electron microscope ("SEM") image of a first electrode structure including an electrolyte layer according to a comparative example. FIG. 3B is a magnified view of the SEM image of FIG. 3A. FIG. 3C is a schematic diagram of a cathode layer 100-1 including an electrolyte layer, according to a comparative example. FIG. 3D is a graph showing variations of a voltage and a specific capacity of a secondary battery according to a comparative example. FIG. 4A is an SEM image of a first electrode structure including an electrolyte layer, according to an embodiment of the invention. FIG. 4B is a magnified view of the SEM image of FIG. 4A. FIG. 4C is a schematic diagram of a cathode layer including an electrolyte layer, according to an embodiment of the invention. FIG. 4D is a graph showing variations of a voltage and a specific capacity of a secondary battery according to an embodiment of the invention. FIG. 5 is a graph showing variations of energy density according to changes in thickness of the cathode layer, according to an embodiment of the invention.

The cathode layer 100-1 according to the comparative example may be formed by sintering, through a sintering process, a cathode active material 110-1 included in an active material sheet, after forming the active material sheet by drying an active material slurry. The cathode layer 100-1 of FIGS. 3A and 3B, according to the comparative example, has a high-density structure in which the content of the cathode active material 110-1 is 96 vol %. In the comparative example, the cathode active material 110-1 may be sintered for two hours at a temperature of 1025° C., and an electrolyte layer 300-1 may be coated on the cathode layer 100-1 in which the cathode active material 110-1 is sintered by using a spin coating method or a dip coating method.

Referring to FIG. 3C, the cathode active material 110-1 may be densely arranged in the cathode layer 100-1 according to the comparative example. In the comparative example, the electrolyte layer 300-1 disposed on the cathode layer 100-1, in which the cathode active material 110-1 is densely arranged, may not penetrate into the cathode layer 100-1. Accordingly, conductivity of a metal ion, for example, a lithium ion, may not be smoothly implemented into the cathode layer 100-1 that includes only the cathode active material 110-1 having relatively low ion conductivity. This characteristic of ion transfer into the cathode layer 100-1 may become more apparent as the thickness W of the cathode layer 100-1 increases. As shown in FIG. 3D, as the thickness W of the cathode layer 100-1 increases from 20 µm to 60 µm, the specific capacity of the secondary battery is relatively linearly reduced.

However, an embodiment of the cathode layer 100 depicted in FIGS. 4A and 4B, according to the invention, has a low-density structure in which the content of the cathode active material 110 is 88 vol %. In such an embodiment, the cathode active material 110 may be sintered at a temperature of 1025° C. for 10 minutes. The electrolyte layer 300 may be coated on the cathode layer 100 in which the cathode active material 110 is sintered by using a spin coating method or a dip coating method.

Referring to FIG. 4C, in an embodiment of the cathode layer 100, the cathode active material 110 may be distributed between the pores 120. The electrolyte layer 300 coated on the cathode layer 100 may include the first electrolyte film 310 and the second electrolyte film 320, where the first electrolyte film 310 surrounds an exterior of the cathode layer 100, and the second electrolyte film 320 is disposed in the pores 120 by penetrating into the cathode layer 100. Accordingly, in such an embodiment, conductivity of a metal ion, for example, a lithium ion, may be effectively achieved in the cathode layer 100 in which the second electrolyte film 320 is included. The characteristic of ion transfer in the cathode layer 100 may be more apparent as the thickness W of the cathode layer 100 increases. As shown in FIG. 4D, as the thickness of the cathode layer 100 increases from 20 µm to 60 µm, unlike the comparative example depicted in FIG. 3D, the specific capacity of the secondary battery is not nearly reduced in the process of increasing the thickness W from 20 µm to 40 µm. However, as shown in FIG. 4D, the specific capacity of the secondary battery is rapidly reduced when the thickness W is 60 µm, which is a value beyond a critical value.

FIG. 5 shows energy densities versus thickness changes of the cathode layer 100-1 and the cathode layer 100 of the secondary batteries according to the comparative example and the embodiment, respectively.

When the thickness W of each of the cathode layer 100-1 and the cathode layer 100-1 according to the comparative example and the embodiment is small, for example, when the thickness W is 20 µm, the ion conductivity of the cathode layer 100-1 according to the comparative example and the ion conductivity of the cathode layer 100 according to the embodiment may not be substantially different from each other. However, the cathode active material 110-1 may accumulate with a higher density in the cathode layer 100-1 according to the comparative example than in the cathode layer 100 according to the embodiment, and thus, the secondary battery according to the comparative example shows higher energy density than in the secondary battery according to the embodiment.

Next, when there is an increase in the thickness W of the cathode layer 100-1 and the cathode layer 100 according to the comparative example and the embodiment respectively, for example, when the thickness W is in a range of 30 µm to 50 µm, the ion conductivity of the cathode layer 100-1 according to the comparative example may be greatly reduced relative to that of the cathode layer 100 according to the embodiment. This occurs due to the presence of the second electrolyte film 320 arranged in the cathode layer 100 according to the embodiment. In the case where the thicknesses of the cathode layer 100-1 and the cathode layer 100 are in a range of 30 µm to 50 µm, the cathode active material 110-1 may accumulate more in the cathode layer 100-1 according to the comparative example than in the cathode layer 100 according to the embodiment. Accordingly, when the thicknesses of the cathode layer 100-1 and the cathode layer 100 are in a range of 30 µm to 50 µm, the secondary battery according to the embodiment has a higher energy density due to the ion conductivity difference between the cathode layer 100-1 and the cathode layer 100 of the secondary batteries according to the comparative example and the embodiment.

Accordingly, when the thickness W of the cathode layer 100 increases to a predetermined range, for example, a range of 30 µm to 50 µm, the ion conductivity in the cathode layer 100 may be increased by forming the second electrolyte film 320 in the pores 120 included in the cathode layer 100 to increase energy density of the secondary battery 10, and thus, the energy density of the secondary battery 10 may be increased.

Figure 6:
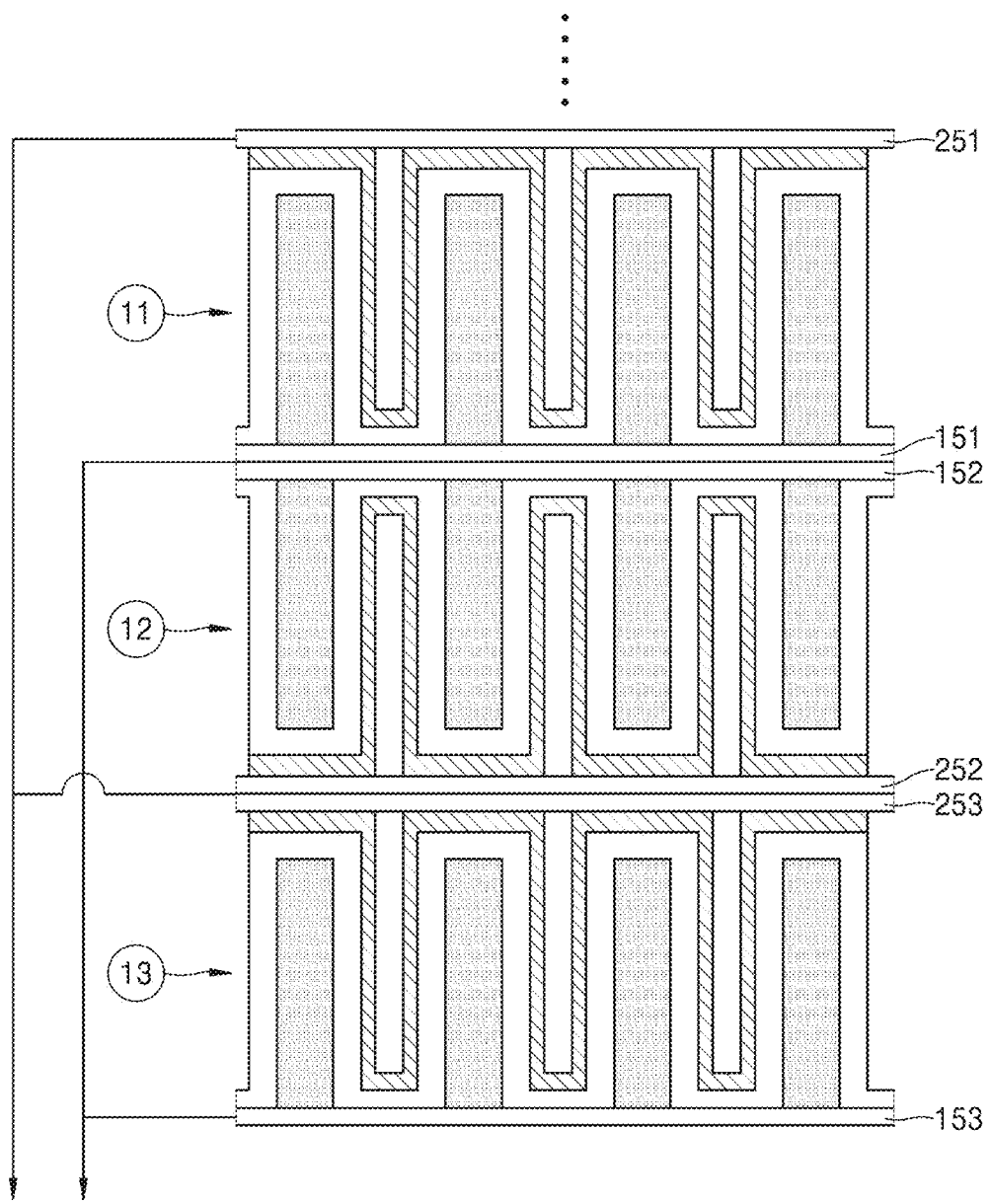
FIG. 6 is a cross-sectional view of a stacking-type secondary battery according to an embodiment of the invention.

FIG. 6 is a cross-sectional view of a stacking-type secondary battery according to an embodiment of the invention.

Referring to FIG. 6, an embodiment of the stacking-type secondary battery may be formed by stacking a plurality of battery cells 11, 12 and 13, each of which may be substantially the same as an embodiment of the battery cell described with reference to FIG. 1. Here, FIG. 6 shows an embodiment, where the battery cells 11, 12 and 13 include a first battery cell 11, a second battery cell 12, and a third battery cell 13, the number of battery cells may be variously modified. The first battery cell 11 may have the same structure as that of the battery cell of FIG. 1. The second battery cell 12 may have the same structure as that of the battery cell of FIG. 1, but may have a reverse structure, that is, an upside-down structure. The third battery cell 13 may have the same structure as that of the battery cell of FIG. 1. Accordingly, in such an embodiment, the battery cells 11, 12 and 13 are stacked in a way such that current collectors of a same polarity contact (face) each other. In an embodiment, when the cathode current collecting layer of the first battery cell 11 is referred to as a first cathode current collecting layer 151 and an anode current collecting layer thereof is referred to as a first anode current collecting layer 251, and the cathode current collecting layer of the second battery cell 12 is referred to as a second cathode current collecting layer 152 and an anode current collecting layer thereof is referred to as a second anode current collecting layer 252, the first cathode current collecting layer 151 and the second cathode current collecting layer 152 may be arranged to contact (face) each other. In such an embodiment, when the cathode current collecting layer of the third battery cell 13 is referred to as a third cathode current collecting layer 153 and an anode current collecting layer thereof is referred to as a third anode current collecting layer 253, the second anode current collecting layer 252 and the third anode current collecting layer 253 may be arranged to contact (face) each other. Accordingly, odd-numbered battery cells 11 and 13 and an even-numbered battery cell 12 may have a reversed structure with respect to each other. The first through third cathode current collecting layers 151, 152 and 153 may be electrically connected to each other, and the first through third anode current collecting layers 251, 252 and 253 may be electrically connected to each other. In an alternative embodiment, the current collecting layers (e.g. 151 and 152) that are in contact with each other may be integrally formed as a single unitary and indivisible unit. In such an embodiment, where a stacking-type secondary battery is formed by stacking the battery cells 11, 12 and 13, a battery capacity per unit area may be substantially increased.

FIGS. 7A through 7F are perspective views showing a method of manufacturing a secondary battery 10, according to an embodiment of the invention.

Figure 7A:
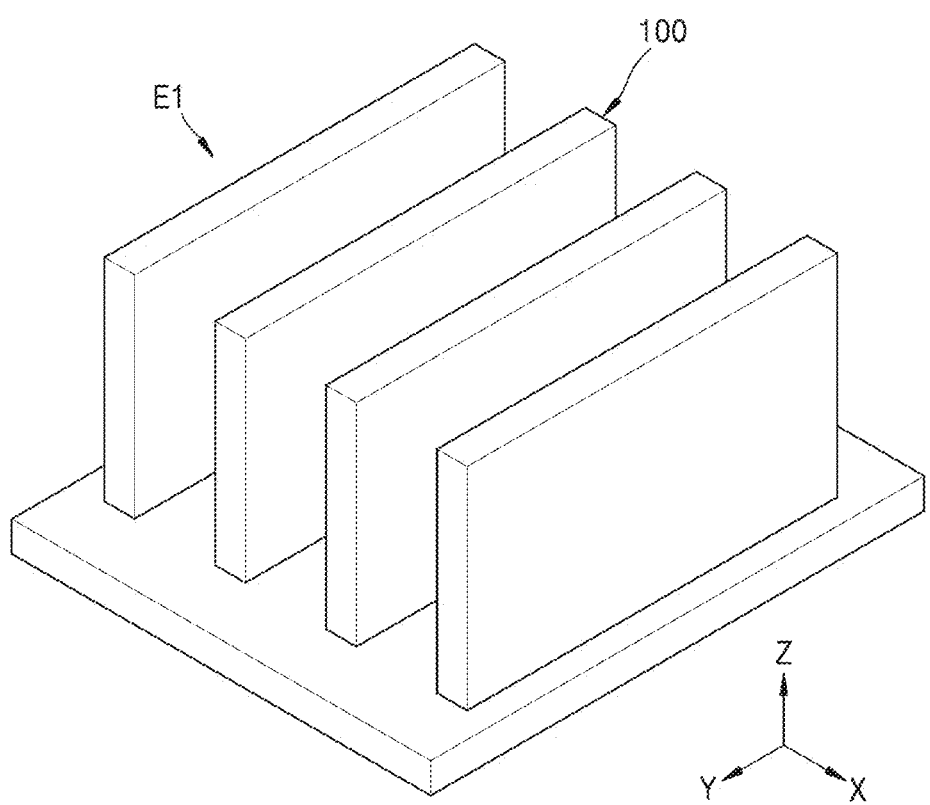
FIGS. 7A through 7F are perspective views showing a method of manufacturing a secondary battery, according to an embodiment of the invention.

Referring to FIG. 7A, the first electrode structure E1 may be provided on the first current collecting layer 150 by arranging a plurality of cathode layers 100 having a porous structure that includes a plurality of pores 120 and having a flat plate-shape. In one embodiment, for example, the first electrode structure E1 may have a structure corresponding to the electrode structure described with reference to FIGS. 2A and 2B. The cathode layers 100 may be formed by forming active material sheets by drying an active material slurry, and sintering the cathode active material 110 included in the active material sheets through a sintering process. In such an embodiment, the active material slurry may be formed, for example, by mixing a cathode active material (e.g., powder), a binder, a dispersing agent and a plasticizer with a solvent. In such an embodiment, a grinder, such as a ball mill or a mixing apparatus, may be used for the mixing. In such an embodiment, the cathode active material 110 may be sintered at a temperature of 1025° C. for 10 minutes. Accordingly, the cathode layers 100 having a low-density structure, in which the content of the pores 120 is in a range of 12 vol % to 30 vol % and the content of the cathode active material 110 is in a range of 70 vol % to 88 vol %, may be formed.

Figure 7B:
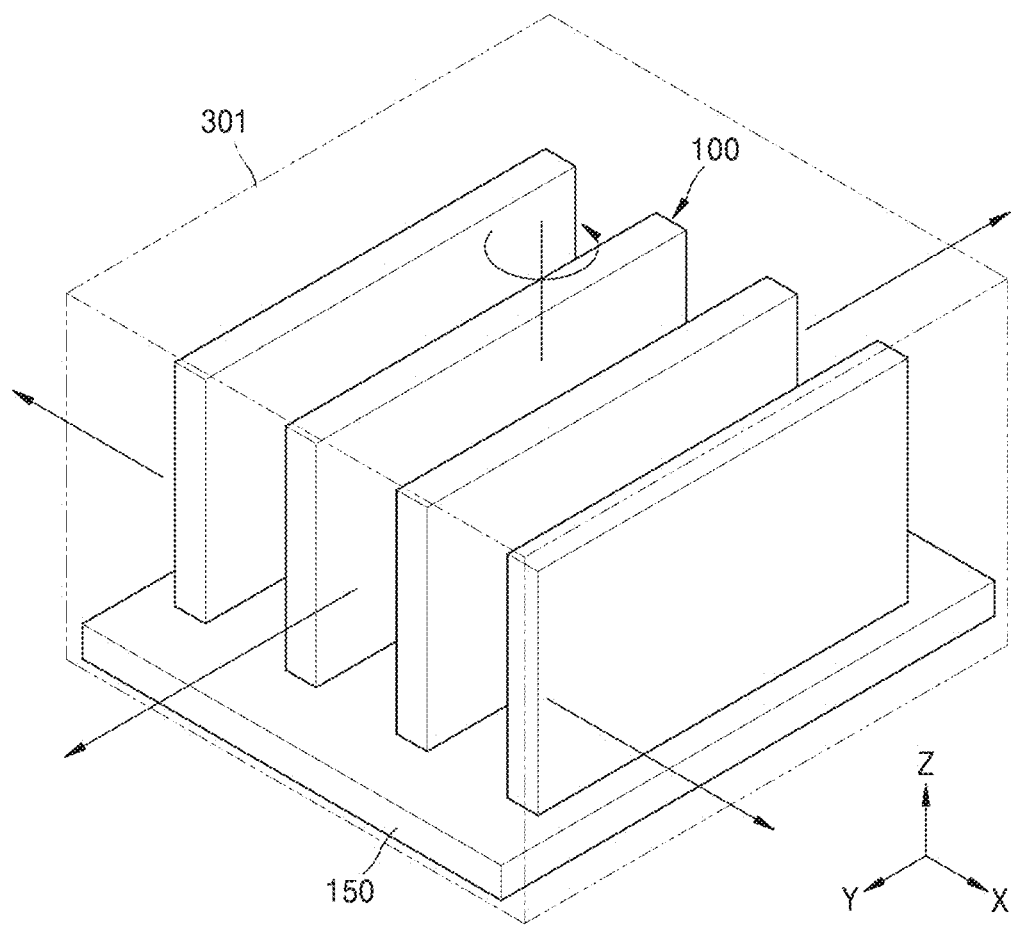
Figure 7C:
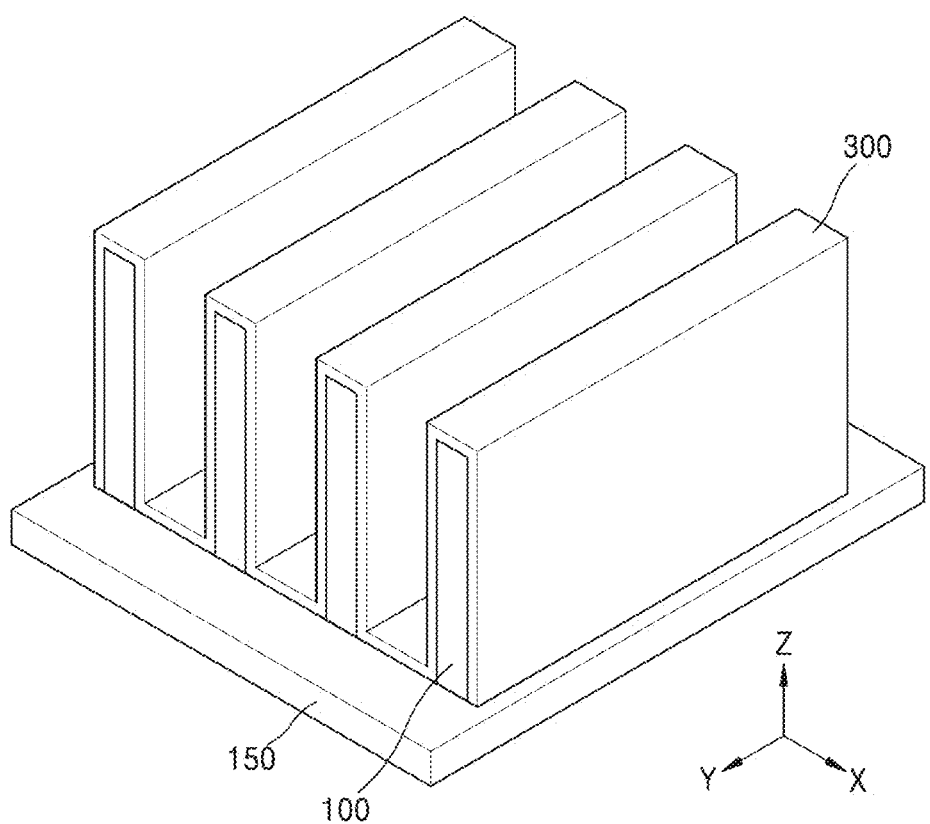

Referring to FIGS. 7B and 7C, after coating a solution containing an electrolyte (e.g., an electrolyte solution 301) on the first electrode structure E1, the electrolyte layer 300 may be formed by using a spin process. The electrolyte may be a solid electrolyte, and the electrolyte solution 301 may be in the form of a sol. Since the 3D electrode structure has an open-type structure in which the cathode layers 100 are spaced apart in a widthwise direction and a lengthwise direction, and thus, the formation of the electrolyte layer 300 by spin coating may be effectively performed. The electrolyte layer 300 described above may include a first electrolyte film 310 arranged on the cathode layers 100, and may also include a second electrolyte film 320 arranged in the pores 120 in the cathode layers 100.

In an embodiment, as described above, the process of forming the electrolyte layer 300 may be performed by using a spin coating method, but not being limited thereto. In an alternative embodiment, the electrolyte layer 300 may be formed by using a dip coating method. In another alternative embodiment, the electrolyte layer 300 may be formed by using a deposition method, for example, atomic layer deposition ("ALD"), chemical vapor deposition ("CVD"), or physical vapor deposition (PVD). In another alternative embodiment, the electrolyte layer 300 may be formed by repeating a layer-by-layer ("LBL") method several times.

Figure 7D:
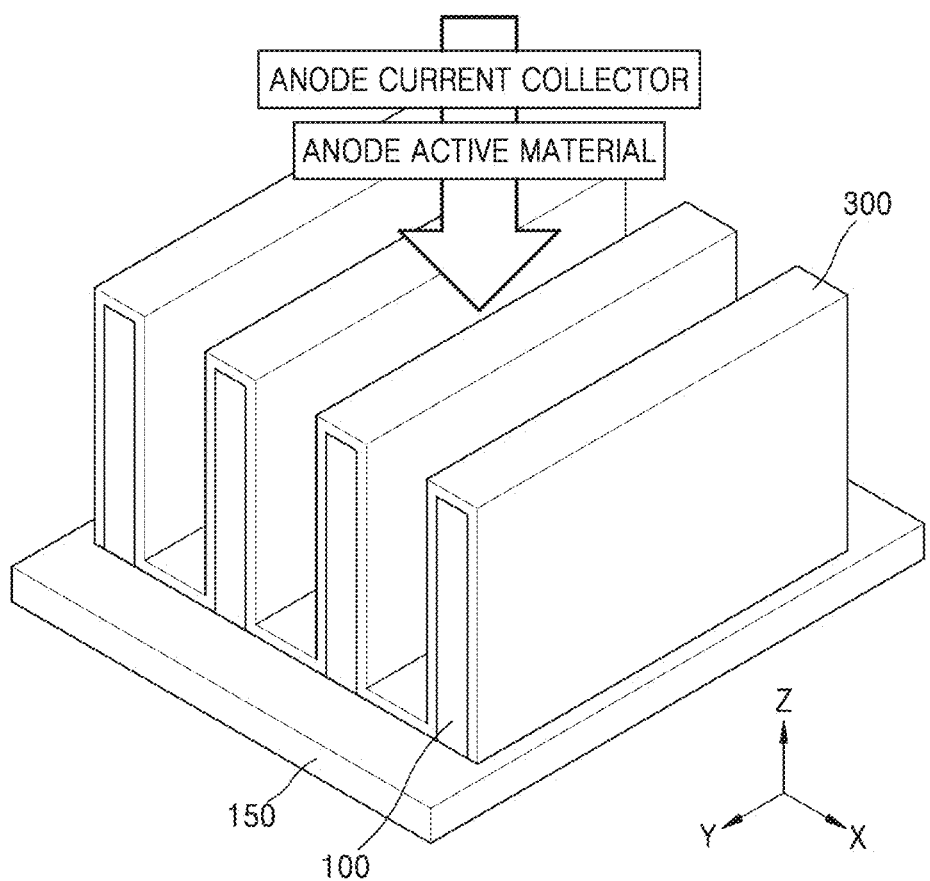
Figure 7E:
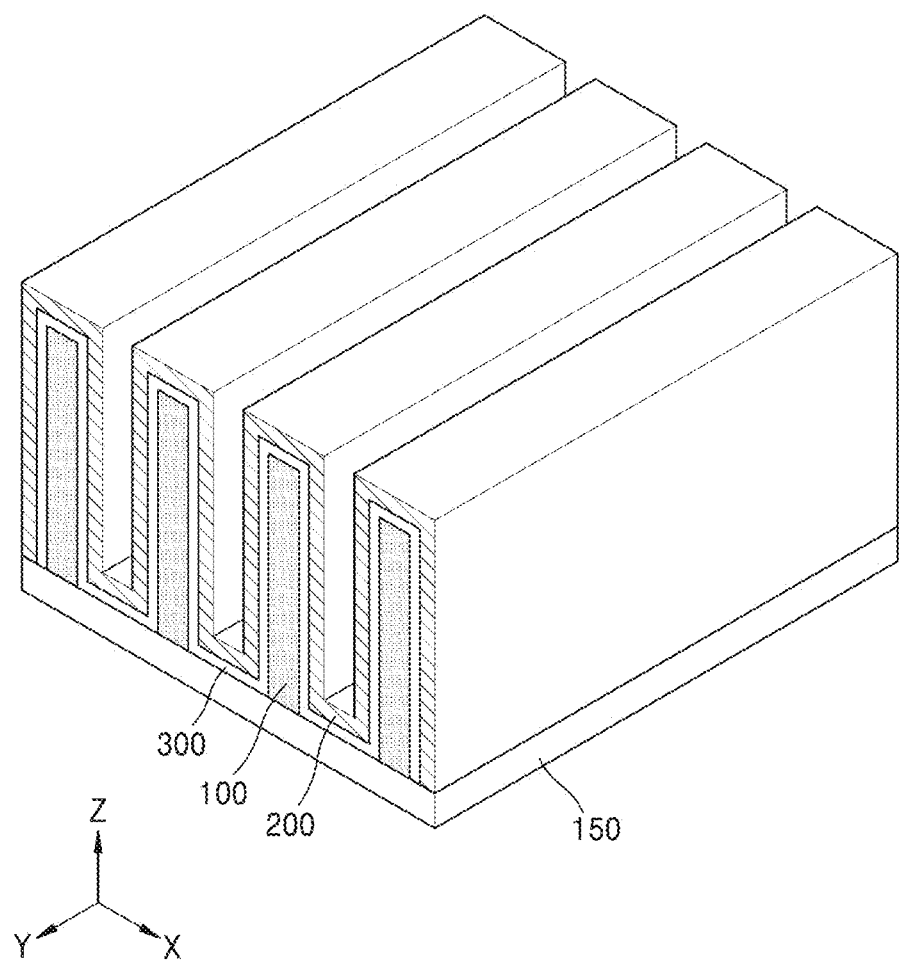
Figure 7F:
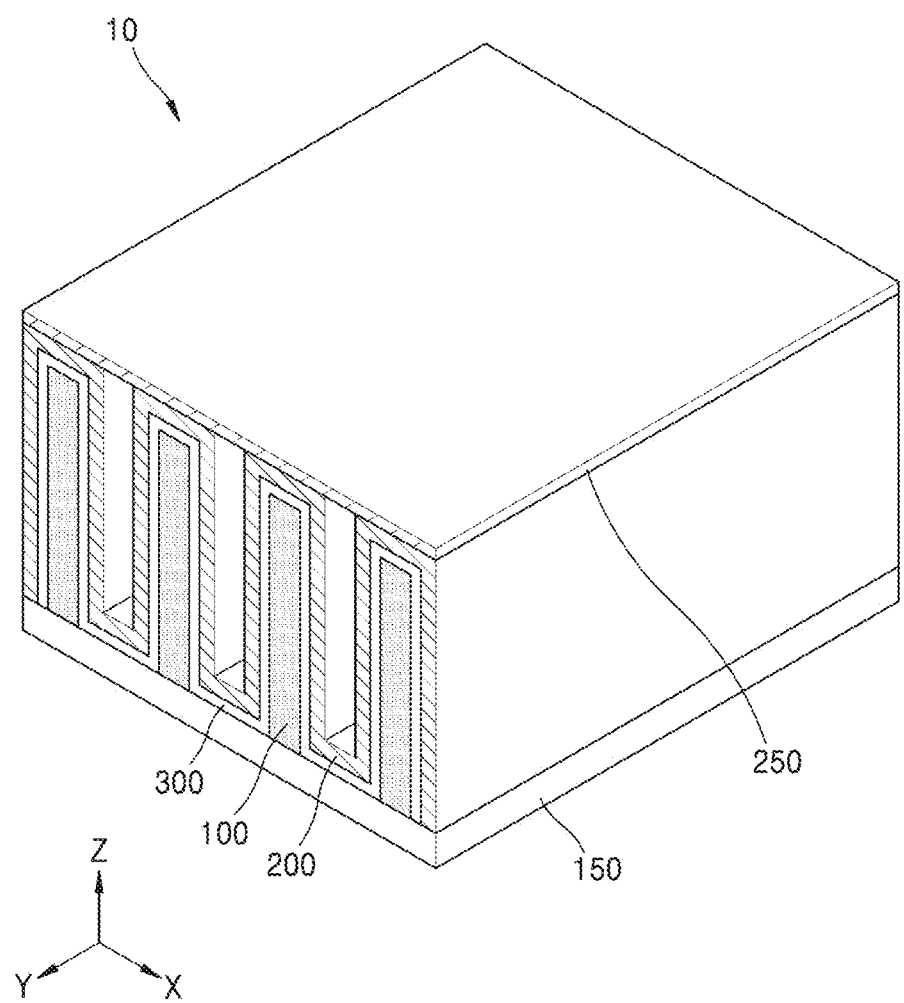

In an embodiment, referring to FIGS. 7D through 7F, the secondary battery 10 may be manufactured by sequentially providing or forming the anode layer 200 and the second current collecting layer 250 on the electrolyte layer 300, the anode layer 200 including an anode active material. In one embodiment, for example, the anode active material included in the anode layer 200 may include, for example, a Li metal, a carbon group material, a silicon group material, or an oxide. In an embodiment, the second current collecting layer 250 may include at least one conductive material selected from, for example, Cu, Au, Pt, Ag, Zn, Al, Mg, Ti, Fe, Co, Ni, Ge, In, and Pd. In one embodiment, for example, the anode layer 200 may be formed by coating an anode active material on the electrolyte layer 300. In an embodiment, the second current collecting layer 250 may be provided to face the first current collecting layer 150. The secondary battery 10 may be, for example, a Li secondary battery, but not being limited thereto. In an embodiment, the secondary battery 10 may be one of various kinds of secondary battery.

According to an embodiment of the invention of a secondary battery, ions easily travel in cathode layers. In such an embodiment, the secondary battery has no capacity reduction at a high rate, and the secondary battery may be usefully applied to various electronic devices including mobile devices and wearable devices.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A secondary battery comprising:
   a plurality of cathode layers arranged spaced apart from each other in a direction, wherein each of the cathode layers has a porous structure including a plurality of pores and has a flat plate-shape;
   an electrolyte layer comprising:
      a first electrolyte film surrounding external surfaces of the cathode layers; and
      a second electrolyte film disposed in the pores of the cathode layers; and
   an anode layer surrounding the first electrolyte film.

2. The secondary battery of claim 1, wherein a volume ratio of the pores to a total volume of the cathode layers is in a range from about 12 vol % to about 30 vol %.

3. The secondary battery of claim 2, wherein an aspect ratio of a height direction to a thickness direction of each of the cathode layers is in a range from about 3 to about 10.

4. The secondary battery of claim 2, wherein each of the cathode layers has a thickness in a range of about 30 μm to about 50 μm.

5. The secondary battery of claim 1, wherein each of the cathode layers comprises:
   a first surface and a second surface facing each other; and
   a third surface and a fourth surface facing each other,
   wherein
   the third and fourth surfaces extend between the first and second surfaces and have an area smaller than an area of the first and second surfaces, and
   the cathode layers are arranged in a way such that the first surface of a cathode layer of the cathode layers and the second surface of an adjacent cathode layer, which is adjacent to the cathode layer among the cathode layers, face each other.

6. The secondary battery of claim 5, wherein the first electrolyte film and the anode layer are disposed on the first surface and the second surface of each of the cathode layers.

7. The secondary battery of claim 1, further comprising:
   a cathode current collecting layer facing and contacting an end portion of each of the cathode layers; and
   an anode current collecting layer contacting a portion of the anode layer and facing the cathode current collecting layer.

8. The secondary battery of claim 7, wherein
the cathode layers, the electrolyte layer, the anode layer, the cathode current collecting layer and the anode current collecting layer collectively define a battery cell, and
the secondary battery has a stacking structure in which battery cells are stacked one on another.

9. The secondary battery of claim 1, wherein each of the cathode layers is a sintered body comprising a cathode active material.

10. The secondary battery of claim 9, wherein the cathode active material is a lithium transition metal oxide.

11. The secondary battery of claim 6, wherein a portion of the first electrolyte film extends from the cathode layer to the adjacent cathode layer in the direction.

12. The secondary battery of claim 6, wherein a portion of the anode layer extends from the cathode layer to the adjacent cathode layer in the direction.

13. The secondary battery of claim 1, wherein a gap between two adjacent cathode layers is greater than 50% of a thickness of each of the cathode layers.

14. The secondary battery of claim 1, wherein the secondary battery is a lithium secondary battery.

15. A method of manufacturing a secondary battery, the method comprising:
arranging a plurality of cathode layers to be spaced apart from each other in a direction on a cathode current collecting layer, wherein each of the cathode layers has a porous structure including a plurality of pores and has a flat plate-shape; and
coating an electrolyte layer on the cathode layers.

16. The method of claim 15, wherein a volume ratio of the pores to a total volume of the cathode layers is in a range from about 12 vol % to about 30 vol %.

17. The method of claim 16, wherein each of the cathode layers has a thickness in a range of about 30 μm to about 50 μm.

18. The method of claim 15, wherein the electrolyte layer comprises:
a first electrolyte film surrounding external surfaces of the cathode layers; and
a second electrolyte film disposed in the pores.

19. The method of claim 15, wherein the coating the electrolyte layer on the cathode layers comprises using a spin coating method or a dip coating method.

20. The method of claim 15, wherein each of the cathode layers is a sintered body comprising a cathode active material.

* * * * *